Oct. 23, 1923.

E. J. MARTEL ET AL 1,471,496

SWITCH SUPPORT

Filed Oct. 25, 1919

Witnesses
J. S. McCathern
U. B. Hillyard.

Inventors
Edgar J. Martel and
Robert G. Sanders
By Richard B. Owen,
Attorney

Oct. 23, 1923.  1,471,496
E. J. MARTEL ET AL
SWITCH SUPPORT
Filed Oct. 25, 1919  2 Sheets-Sheet 2
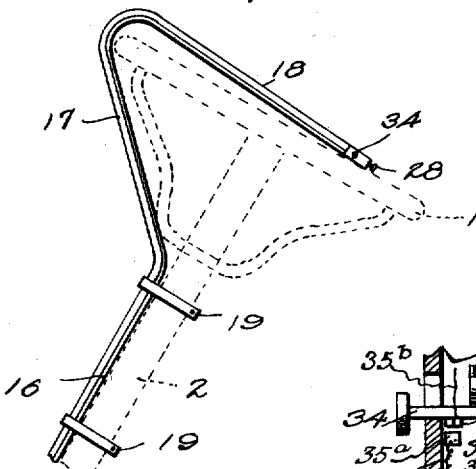
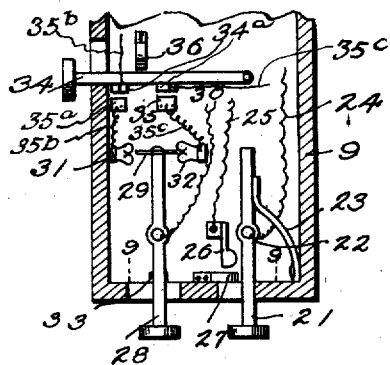
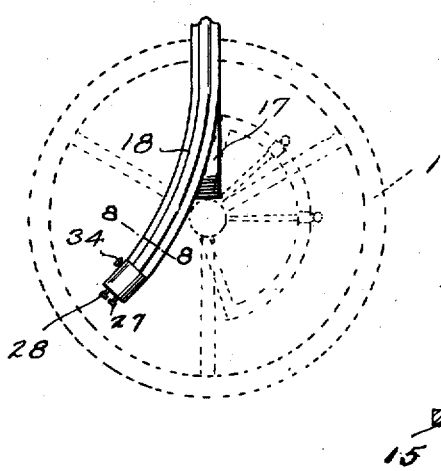
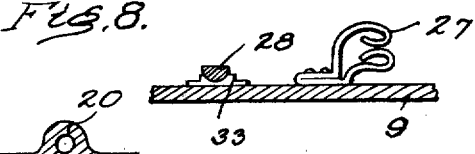
Witnesses
J. P. McCath
U. B. Hillyard
Inventors
Edgar J. Martel and
Robert G. Sanders
By Richard B. Owen,
Attorney Patented Oct. 23, 1923.

1,471,496

UNITED STATES PATENT OFFICE.

EDGAR J. MARTEL AND ROBERT G. SANDERS, OF LACONIA, NEW HAMPSHIRE.

SWITCH SUPPORT.

Application filed October 25, 1919. Serial No. 333,323.

*To all whom it may concern:*

Be it known that we, EDGAR J. MARTEL and ROBERT G. SANDERS, citizens of the United States, residing at Laconia, in the county of Belknap and State of New Hampshire, have invented certain new and useful Improvements in Switch Supports, of which the following is a specification.

The invention provides novel means for the control of the headlights and signalling means of automobiles and mechanically propelled vehicles generally.

The invention relates to electrically operated lights and signalling mechanism and supplies controlling means which are readily accessible at all times for convenient operation without requiring the driver to relax grip on the steering wheel. The controlling means admit of independent operation of the lights and signal and the throwing of the lights out of action during daylight so as to conserve current.

The drawings illustrate a preferred embodiment of the invention. However, it is to be understood that in adapting the same to meet different conditions, various changes in the form, proportion and minor details of construction may be resorted to without departing from the nature of the invention as claimed hereinafter.

Referring to the drawings hereto attached:—

Figure 5 is a view similar to Fig. 3 of a further modification, the steering wheel and its post being shown in dotted lines.

Figure 6 is a top plan view of the parts illustrated in Fig. 5.

Figure 7 is a sectional detail of the support on a larger scale showing more clearly the switch element.

Figure 8 is a sectional detail of the modified form of support shown in Figs. 5 and 6 on the line 8—8 of Fig. 6, the same being illustrated on a larger scale.

Figure 9 is a detail view of the switch holding means illustrated in Fig. 7.

Corresponding and like parts are referred to in the following description and indicated in the several views of the drawings by like refrence characters.

To demonstrate the application of the invention a steering wheel 1 and its supporting post 2 are illustrated. These parts may be of any well known construction such as utilized in motor vehicles.

Figure 1:
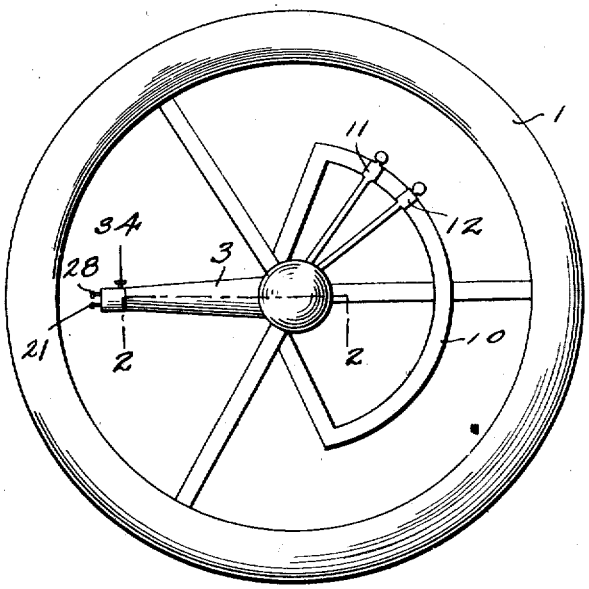
Figure 1 is a plan view of the steering wheel of a mechanically propelled vehicle provided with controlling means embodying the invention.
Figure 2:
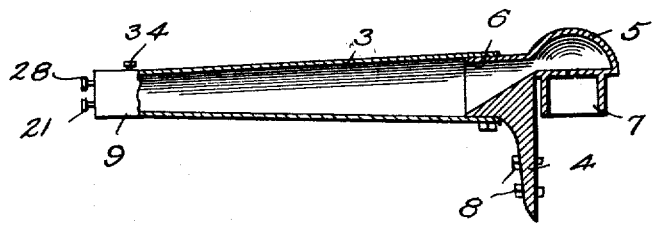
Figure 2 is a sectional detail of the supporting arm on the line 2—2 of Fig. 1, showing the parts on a larger scale.

The support for the controlling means may be variously formed as shown in the several views of the drawings. Referring more particuarly to Figs. 1 and 2 the support consists of a hollow arm 3 which is attached to the steering post 2 by means of a bracket, the latter comprising a base 4 a cap 5, a projecting end 6 and a depending socket 7. The socket 7 and cap 5 are in line, the socket 7 extending over the extremity of the post and the cap 5 providing a finish so as to present a neat appearance. The projecting end 6 provides for coupling of the arm 3 to the bracket. The element 4 extends alongside the post 2 and is adapted to be secured thereto by suitable fastenings 8. The arm 3 is preferably made tapering throughout its length and terminates in an end 9 which contains the switch mechanism shown more particularly in Fig. 7. The support is disposed in such a manner as to bring the switch elements within convenient reach of the rim of the steering wheel 1 so that said switch element may be readily and conveniently manipulated without requiring the operator to relax the hold upon the steering wheel. The parts 10, 11 and 12 represent the notched segment and usual control levers of a mechanically propelled vehicle.

Figures 3, 4:
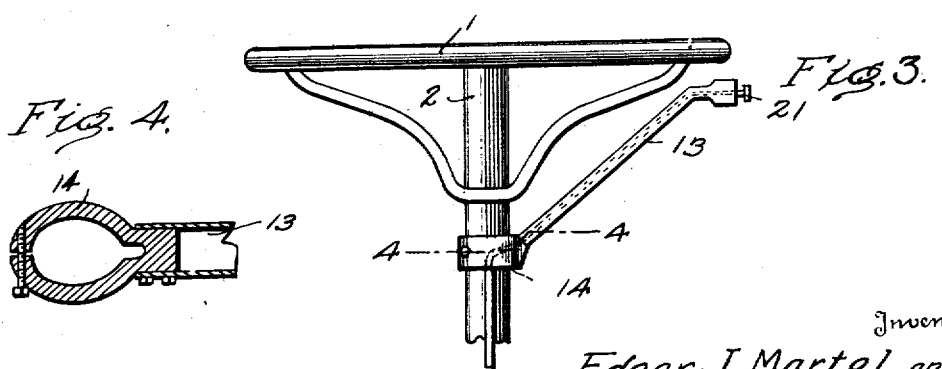
Figure 3 is a side view of a steering wheel and post, showing a modified form of support for the controlling means.
Figure 4 is a sectional detail of the attaching means of the support on the line 4—4 of Fig. 3, the parts being shown on a larger scale.

Referring to Figs. 3 and 4 the support comprises an arm 13 and a clamp 14 the latter being secured to the steering post 2. The arm 13 is disposed at an inclination to the horizontal and its upper end terminates just beneath the rim of the steering wheel within convenient reach of the driver. The arm 13 like the arm 3 is hollow so as to receive the several wires connecting the switch elements with the electrically operated devices, not shown. The switch elements are disposed at the upper end of the arm 13 and are substantially the same as those illustrated in Fig. 7.

Figs. 5 and 6 show a further modified form of support which consists of a bar 15 bent into the shape substantially shown and comprising portions 16, 17 and 18. The portion 16 extends alongside the steering post 2 and is made fast thereto by means of clamps 19. The portion 18 overhangs the steering wheel as shown more clearly in Fig. 5 and is curved laterally as indicated in Fig. 6 and terminates in an end which receives the switch elements. The portion 17 connects the parts 16 and 18 and inclines upwardly and outwardly from the steering post. The bar 15 is formed with a rib 20 which is apertured to receive the conducting wires. The form of support is susceptible of general application and provides for disposing the switch elements in a plane above the steering wheel which may be preferred in some instances.

As hereinbefore stated the switch elements and cooperating parts are substantially the same irrespective of the nature of the support and are illustrated in detail in Figs. 7 and 9. Nearly all motor driven vehicles are provided with an audible signal of some nature. The switch element 21 is provided for closing the circuit of this audible signal, and consists of a member pivoted at 22 and normally acted upon by means of a spring 23 supported in normal or open position. One of the wires of the signal is illustrated at 24 and connects with the element 22. The other wire is indicated at 25 and connects with a contact 26. As shown more clearly in Fig. 7 the signal circuit is normally open. Manipulation of the switch element 21 closes the signal circuit through the contact 26 as will be readily appreciated. The parts may be so disposed that the element 21 may be brought temporarily into engagement with the contact 26 so as to sound the signal intermittently. If it be required to sound the signal continuously the element 21 may be moved to a greater extent and is retained in such position by means of a suitable catch 27. The switch element 28 is similar in construction and mounting to the switch element 21 and is pivotally supported and is provided at its inner end with a contact element 29 which projects laterally in opposite directions. A wire 30 connects the battery, or other source of current, not shown, with the switch 28. A contact 31 is electrically connected with the means whereby the head light is dimmed. A contact 32 similar to the contact 31 is electrically connected direct with the head light. Proper manipulation of the switch element 28 enables the light to be controlled either directly or by means of the dimmer. The element 28 is adapted to be held in neutral position as indicated in Fig. 7 by means of a suitable catch 33. A switch element 34 carries insulated contacts 34ª adapted, when the switch is in proper position, to cooperate through contacts 35 and 35ª and wires 35ᵇ, 35ᶜ with both contacts 31 and 32 so as to admit of the light mechanism being thrown out of action during daylight thereby conserving the electric fluid. When the light mechanism is to be thrown out of action the switch element 34 is moved so as to break contact with the elements 35, 35ª and is held in inoperative position by means of a suitable catch 36 to permit the foregoing cooperation of the switch 34 with the contacts 35, 35ª, the switch 34 is provided with two insulated contacts. It is observed that the projecting ends of the several switch elements are equipped with buttons to admit of their ready operation. For convenience and to avoid confusion the projecting ends of the switch elements 31 and 28 are disposed at the end of the support where as the projecting end of the switch element 34 is disposed at one side of the support so as to be out of the way and not interfere with the ready manipulation of the elements 21 and 28.

It will be understood from the foregoing taken in connection with the accompanying drawings that the invention provides means which may be readily attached to the steering post of a motor vehicle so that the control switches of the signal means and lights may be conveniently disposed for manipulation without requiring the hold upon the steering wheel to be relaxed, the mechanism being such that the light mechanism may be thrown out of action when required thereby preventing any waste of the electric current.

The foregoing description and accompanying drawings have reference to what may be considered the preferred or approved form of our invention. It is to be understood that we may make such changes in construction and arrangement and combination of parts, materials, dimensions, et cetera as may prove expedient and fall within the scope of the invention as claimed.

Having thus fully described our invention what we claim as new and desire to secure by Letters Patent, is:—

1. In means of the character specified a supporting member comprising a socket to fit the top of a steering post, a bracket on the socket for securing it to a post, switch elements mounted on the supporting member and adjacent the rim of a steering wheel, and an independent switch element upon the supporting member projecting laterally therefrom.

2. Electric controlling means for automobiles comprising a housing having a socket to receive a steering post head, a cap for the same, a base also on the housing adapted to be secured to a steering post, a hollow arm on the base and cap, and a switch on the arm.

In testimony whereof we affix our signatures in presence of two witnesses.

EDGAR J. MARTEL.
ROBERT G. SANDERS.

Witnesses:
Dr. C. NORMANDIN,
F. E. NORMANDIN.